United States Patent [19]

Fuller

[11] 4,182,363
[45] Jan. 8, 1980

[54] LIQUID LEVEL CONTROLLER

[76] Inventor: Mark W. Fuller, 547 Crother Memorial Hall, Palo Alto, Calif. 94305

[21] Appl. No.: 963,394

[22] Filed: Nov. 24, 1978

Related U.S. Application Data

[63] Continuation of Ser. No. 745,615, Nov. 29, 1976, abandoned.

[51] Int. Cl.² .............................................. G05D 9/12
[52] U.S. Cl. .................. 137/392; 73/304 R; 340/620
[58] Field of Search .................. 73/304 R, 304 C; 137/392; 250/577; 340/244 R, 244 C

[56] References Cited

U.S. PATENT DOCUMENTS

| | | | |
|---|---|---|---|
| 2,839,742 | 6/1958 | Sumner | 340/244 C |
| 2,925,101 | 2/1960 | Dunham | 137/392 |
| 3,584,643 | 6/1971 | Burke | 137/392 |
| 3,602,251 | 8/1971 | Hill | 137/392 |
| 3,641,544 | 2/1972 | Radin | 340/244 C |
| 3,657,556 | 4/1972 | Foster | 73/304 R |
| 3,670,765 | 6/1972 | Haynes | 137/392 |
| 3,741,683 | 6/1973 | McTamaney et al. | 137/392 |
| 3,894,240 | 7/1975 | Rose | 250/577 |

FOREIGN PATENT DOCUMENTS 448465  5/1948  Canada .................................. 137/392

Primary Examiner—Martin P. Schwadron
Assistant Examiner—G. L. Walton
Attorney, Agent, or Firm—B. Deon Criddle

[57] ABSTRACT

A durable, long lasting liquid level controller utilizing an encapsulated, low current, solid state circuit, projecting metal probes arranged to minimize erroneous readings due to liquid adhering to the probes and a wave discriminating means as part of the encapsulated solid state circuitry, said wave discriminating means serving to eliminate false signals resulting from splash or wave action.

5 Claims, 3 Drawing Figures

LIQUID LEVEL CONTROLLER

This is a continuation of application Ser. No. 745,615, filed Nov. 29, 1976 and now abandoned.

BRIEF DESCRIPTION OF THE INVENTION

1. Field of the Invention

This invention relates to liquid level control devices used in maintaining a liquid level in a reservoir between predetermined upper and lower limits. It is particularly concerned with sensing devices used to determine the liquid level and to supply signals that can be used to regulate a valve, pump or other such device controlling flow into and/or out of the reservoir.

2. Prior Art

There have been a great many liquid level control devices developed in the past and many of these have used sensing devices that indicate liquid level or that operate control structure to regulate such liquid level within the reservoir. U.S. Pat. No. 3,967,238, for example, shows a liquid level sensor for sensing, but not regulating, the levels of brake fluid in the master cylinder of a vehicle. The sensor utilizes probes that are inserted into the fluid of the master cylinder and utilizes solid state circuitry, with the probes, to provide a signal that will activate a warning mechanism when the level of the liquid in the cylinder falls below a predetermined level. Signal integration is used to integrate a signal over a time period, to thereby avoid a false alarm due to a momentary shift in attitude of the vehicle on which the unit is used, or due to vehicle acceleration. This patent, however, does not show a solid state level control circuit, nor does it show probes projecting from wells provided in an encapsulating housing for the circuit used, such that the signal errors commonly resulting from liquid adhering to the housing and probes are greatly reduced. U.S. Pat. No. 3,584,643, also teaches the use of a solid state circuit for liquid level control purposes. In this patent the solid state circuit controls a pump and motor in response to the output of a bridge network, to regulate the level of the material in the container. The relays of this circuit would not operate if they were totally encapsulated. U.S. Pat. No. 3,894,240, also utilizes solid state circuitry in maintaining a liquid level between upper and lower probes. In this patent, a neon lamp is used to latch the circuit and a detection device is used to monitor the state of the neon lamp and to control the power to a pump used in filling the reservoir. The disclosed circuit is not encapsulated, and does not provide any wave discrimination means or any means to prevent erroneous signals from liquid adhering to probes. If encapsulated, the circuit, as shown in the patent, would not be operable, since there would be no way to detect the intensity of the light. Thus, while these prior art systems may be entirely satisfactory for many purposes, they may not be satisfactory for use in level detection and control systems where the circuit is subject to damage due to corrosion, temperature, or other factors, and must have the advantages of small size and self-contained one-unit packaging while being totally protected from surrounding conditions.

SUMMARY OF THE INVENTION

Principal objects of the present invention are to provide a liquid control unit that is small, reliable, completely self-contained, rugged, and water tight, for insertion into a reservoir or the like where it can sense liquid level and generate a signal indicative of the level sensed for regulating such apparatus as may be used in maintaining the level between desired limits.

Principal features of the invention include the use of a plurality of probes extending from within wells formed in an encapsulating housing of the unit, said probes extending outwardly from the housing to different lengths, so that when the unit is positioned for liquid level control in a reservoir, the longest extending probe is a ground probe, the shortest probe is a high level control probe, the next longest probe is a low level control probe, and the next longest probe is an emergency signal generating probe.

Other features include the sequential arrangement of the probes, by length, as they project from a face of the housing so that they can be used in different orientations, if desired, and the provision of wells in the housing from which the probes extend so that the danger of erroneous reading from water adhering to the housing between probes is reduced, regardless of the chosen orientation of the unit.

Additional objects and features of the invention will become apparent from the following detailed description and drawings, disclosing what is presently contemplated as being the best mode of the invention.

THE DRAWINGS

In the drawings

FIG. 1 is a perspective view of the liquid level controller of the invention, showing the probes projecting from wells in the encapsulated housing and the probes extending for different lengths from the housing;

FIG. 2, a vertical section, taken on the line 2—2 of FIG. 1, and further showing the probe mountings; and FIG. 3, a schematic drawing of the circuit of the unit.

DETAILED DESCRIPTION

Referring now to the drawings

Figure 1:
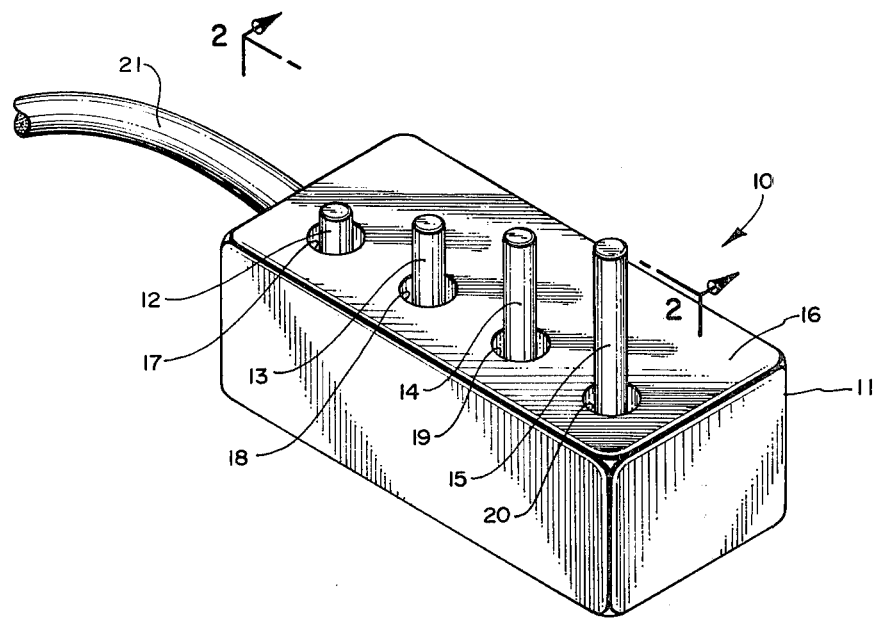

In the illustrated preferred embodiment, the liquid level controller, shown generally at 10, includes an encapsulating housing 11 from which probes 12, 13, 14 and 15 project from the bottom wall 16. The probes, respectively extend through wells 17, 18, 19 and 20 formed in the housing. A cable 21 extends from an end wall 22 of the encapsulating housing 11 and the cable 21 includes the wires necessary to connect the encapsulated circuit 23 (FIG. 2) to a power source, not shown, ground, and the pump valve, or other flow control means, not shown, and to an additional warning or control means which will be activated by the device in the event that the fluid level continues to fall below a predetermined liquid level. The cable 21 extending into housing 11 is encapsulated and a watertight bond thus surrounds the portion of the cable extending into the housing.

The encapsulating housing 11 completely covers and encloses all of the circuit components, except for the outwardly projecting portions of the probes and the outwardly extending portion of cable 20 and the housing 11 can be made very compact. For example, the housing can be about 7.5 cm by 10.0 cm by 2.5 cm. The housing 11 is preferably made of an epoxy, or epoxy-urethane blend, such as that known as "Fast Cast", having a high wetting angle, great strength and some resiliency so that liquids will not tend to adhere to the housing and it will not shatter on impact.

The probes 12, 13, 14 and 15 extend from the wells 17, 18, 19 and 20 formed in the bottom wall 16 of the housing, for different distances beyond the housing. Probe 12, is the shortest probe and is used as the upper level indicator and sensing means for the liquid level control device. Probe 13 extends from the housing 11 further than probe 12 and is used as a low level indicator and control probe so that, as will be further explained, a liquid level will be maintained between the ends of the probes 12 and 13. Probe 14 extends even further beyond the housing 11 than does probe 13, and probe 14 serves as an emergency signal generating probe that will detect and sense the level of the liquid as it moves below a safe level and that will then actuate circuit components to cut in a second a pump, valve or other such device used and/or to signal a warning device that the fluid level in the reservoir has fallen below the low level probe. Probe 15 extends furthest from the housing 11 and comprises a ground probe through which various circuits are completed as the other probes are submerged. The probes 12-15 are arranged to project from the encapsulated housing 10 in sequential order according to length. Thus, if the unit is placed in a reservoir with the probes projecting parallel to the water surface, water in the reservoir will contact the probes 15-12, in that order.

The entire liquid level control device is thus packaged in a manner that will allow it to be used for a great many purposes. It will function in any even slightly conducting liquid, and operates at extremely low current levels, i.e. less than one microampere, so as to be completely safe for use in virtually any application. Its small size, rugged and self-contained construction, and low cost make it ideal for use in swimming pools, water fountains, electrically activated toilets, and other such structures. It is also very economical to operate, having a power consumption rate of less than 6 milliampere or less than $\frac{1}{4}$ watt.

The probes 12, 13, 14 and 15 are preferably made of quarter inch diameter stainless steel rod and are electrically connected to the circuit 23 which is formed on a circuit board that is then encapsulated in a body compound making up the housing 11. This structure insures a rugged, watertight package. The probe life is measured in terms of hundreds of years, due to the extremely low probe currents involved. This distinguishes the present device from known prior devices wherein higher probe currents are used and the probes are subject to rapid electrochemical erosion. When the housing is positioned for use in a reservoir, with the probes extending downwardly therefrom, the wells 17, 18, 19 and 20 become air chambers as the water surface moves up into engagement with the lower portion of the housing 11. The air trapped in the wells by the water rising into engagement with the lower portion of the housing 11 keeps the water from wetting the probes, within the wells. This greatly reduces the possibility of erroneous readings occuring as a result of a water film adhering to the housing between adjacent probes and thereby completing a circuit that would allow for such false readings. If the probes are positioned to extend parallel to the water surface the wells become caves and it is again extremely unlikely that a water film can be formed on the housing between probes to trigger erroneous signals.

Figure 2:
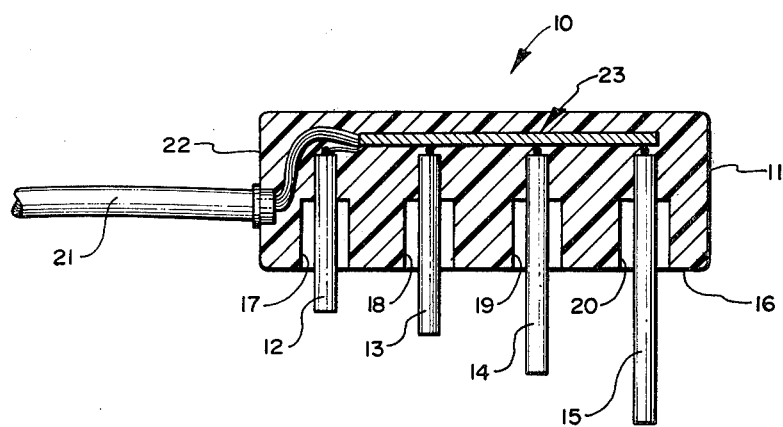
Figure 3:
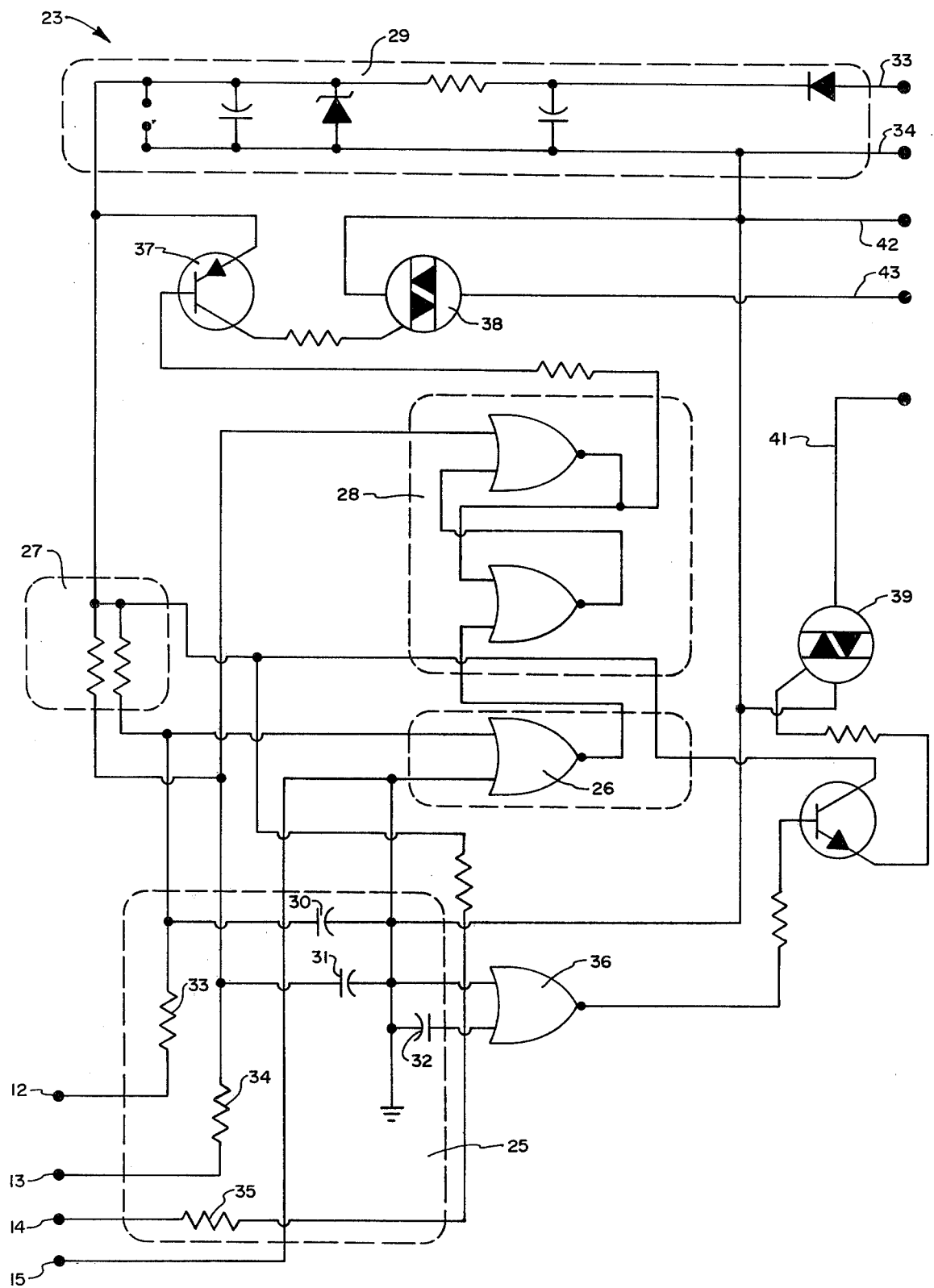

While it will be apparent that other solid state circuits could be used, it only being necessary that the circuit be capable of performing the desired functions and that it can be fully encapsulated without affecting the operation of the circuit, the circuit shown generally at 23 in FIG. 2 is presently a preferred embodiment of the invention. As shown, the circuit includes a time integrator shown generally at 25, an inverter 26, pull up resistors 27, an R-S flip flop shown generally at 28, and a self-contained twelve volt DC power supply shown generally at 29. The time integrator is comprised of capacitors 30, 31, and 32 and resistors to the probes 12, 13, and 14. These resistor-capacitor networks serve to delay the circuitry from acting on an input from the probes. Thus, if the capacitor-resistor combinations are chosen to provide a delayed response of two seconds, for example, the circuit will not be activated by splash, waves, or other momentary liquid contact with or departure from the probes.

The R-S flip flop 28, the inverter 26 and another inverter 36 are wired in conventional fashion from a single, quad two-input NOR gate CMOS integrated circuit chip. This is coupled through a transistor 37 to a three-ampere triac 38, which is the main switching component of the unit. Generally, the device is designed to function on 24 volts AC, since this is the most common voltage used in the operation of electric valves. However, other voltages and currents can be supplied, with minor alterations in the circuit being necessary to accommodate different voltages. The internal power supply unit 29 converts AC current from lines 33 and 34 to twelve volt DC as required for the logic operation. This is designed to protect circuitry from surges and transients. The 12 volt DC then becomes the voltage across the probes when they are connected into the circuit by the level of the liquid being detected. The probe 14 is normally submerged in the liquid being detected, and, when the liquid level falls below the end of this probe, the triac 39 is turned on thereby completing a circuit to a second valve, pump, or other device being used to supply liquid to the reservoir and/or a warning system that is operated to indicate that the level is unsafe, through line 41. The probe 14 thus acts as an emergency shut down device which will initiate operation of the secondary valve or pump, and/or signal a warning should the liquid being sensed reach a predetermined unsafe, low level.

If the system is in a safe operating condition the reservoir level will be maintained by the primary fill system, which may be a filler device such as a pump, inlet valve or the like, (not shown) controlled by the probes 12 and 13. In operation then, any time the reservoir level falls below the probe 13 the filler device is connected to ground through line 43 to operate the device and to allow flow therethrough to the reservoir. Then, when the reservoir level reaches the probe 12 the circuit to the filler device is deactivated to stop flow therethrough. If, however, the liquid level should continue to drop and fall below the lowermost level of probe 14 an emergency signal is generated to operate a bell, light or other signal device warning of the unsafe low level.

Although a preferred form of my invention has been herein disclosed, it is to be understood that the present disclosure is by way of example and that variations are possible without departing from the subject matter coming within the scope of the following claims, which subject matter I regard as my invention.

I claim:
1. A liquid level control device comprising
   a plurality of probes, including a high probe, a low probe and a ground probe;
   solid state circuit means connected to said probes;

housing means encapsulating said solid state circuit means, including parts of each of said probes, whereby each of said probes extend from said housing through a surrounding well formed in the housing;

a cable extending from said housing, said cable including lead wires to connect the circuit to a power source, ground, and a means for controlling liquid level in a reservoir;

the probes extend through the wells and from the housing to different distances from the housing, so that when the housing is arranged in a reservoir with the probes extending downwardly therefrom, the wells extend upwardly in the housing and the probes extend different distances therefrom into the reservoir, with the high probe extending the shortest distance therefrom, the low probe extending the next greatest distance therefrom and the ground probe extending the greatest distance from the housing; and the probes extend from a face of the housing parallel to one another and in sequential order according to length, so that when the housing is positioned with the probes extending parallel to liquid in the reservoir the high probe is above the low probe.

2. A liquid level control device as in claim 1, further including an emergency signal generating probe extending through a well in the housing to a distance between the projecting end of the low probe and the projecting end of the ground probe.

3. A liquid level control device as in claim 2, wherein the emergency signal generating probe extends parallel to the other probes and is arranged to project from the face of the housing in sequential order, according to length, with the other said probes.

4. A liquid level controller as in claim 1, wherein the solid state circuit means includes means for delaying input signals from the high and low probes to the circuit means, whereby false signals due to only momentary liquid contact with the probes is prevented.

5. A liquid level controller as in claim 4, wherein the means for delaying input signals comprises capacitors respectively electrically connected to the high and low probes.

* * * * *